June 1, 1954 C. SCHMIDT 2,679,874
MEAT CUTTING MACHINE
Filed Aug. 3, 1950

Conrad Schmidt
INVENTOR
BY CA Snow Heo.
ATTORNEYS

Patented June 1, 1954

2,679,874

UNITED STATES PATENT OFFICE 2,679,874

MEAT CUTTING MACHINE

Conrad Schmidt, Hyattsville, Md., assignor to Pittsburgh-Erie Saw Corporation, Pittsburgh, Pa., a corporation of Delaware Application August 3, 1950, Serial No. 177,461

3 Claims. (Cl. 146—189)

This invention relates to meat cutting machines of the type embodying a hollow cylindrical casing in one end of which is mounted a perforated cutter plate against which rotary cutting blades move in cutting and forcing the cut meat through the perforations of the cutter plate.

The primary object of the invention is to provide a cutter embodying radiating arms which are formed with slots in which the cutting blades are secured, the cutting blades moving over the inner surface of the perforated cutter plate to cut the meat which is fed to the perforated cutter plate, by means of a feed screw, operating within the hollow cylindrical casing, the blades being so constructed and arranged that they extend to a point flush with the walls of the rectangular opening of the cutter, eliminating the usual pockets at the ends of the knives of a meat cutting machine, due to the inner ends of knives terminating short of the rectangular stud opening of the cutter, thereby eliminating the possibility of the collection of meat at the inner ends of the blades, to become spoiled to impair the quality of the meat being cut.

Another object of the invention is to provide a cutter, wherein the blades thereof are positioned within the blade openings of the star-shaped cutter, in such a way that they are disposed at substantially oblique angles with respect to the base of the cutter, thereby presenting a cutting edge which will tend to promote the cutting operation and add to the efficiency of the machine.

Still another object of the invention is to provide a cutter which cooperates with a perforated cutter plate, wherein the capacity of the perforated cutter plate will be substantially increased owing to the added number of perforations which may be made in the cutter plate adjacent to the stud opening of the cutter plate.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
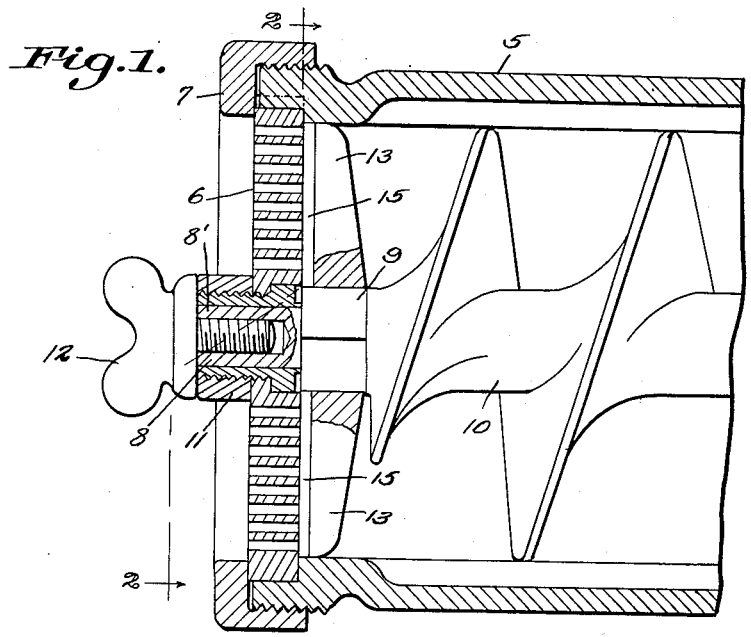
Figure 1 is a fragmental longitudinal sectional view through a barrel or cylinder of a meat cutting machine, illustrating cutter blades constructed in accordance with the invention.
Figure 2:
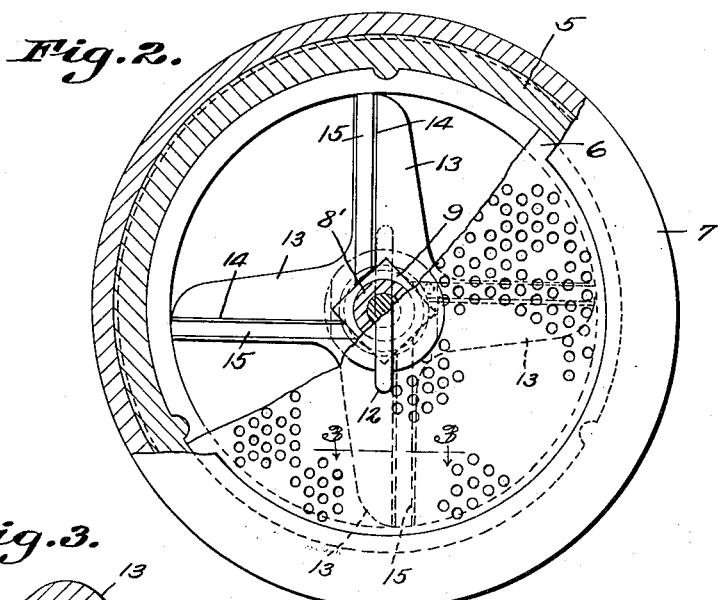
Fig. 2 is a sectional view taken on line 2—2 of Fig. 1.

Referring to the drawing in detail, the machine comprises a barrel or cylindrical body portion 5 formed with a recess in the outer end thereof, in which the perforated cutter plate 6 is secured, as by means of the clamping ring 7.

The perforated cutter plate 6 is provided with a central opening in which the bearing 8' is mounted and through which the hollow end 8 of the stud 9 formed at one end of the feed screw 10 extends, the bearing 8' being externally threaded to accommodate the internally threaded sleeve 11 which is held in position, by means of the wing nut 12, which construction permits of ready dismantling of the meat cutting machine for purposes of cleaning or repairing the machine.

The rotary cutter which cooperates with the perforated cutter plate 6, embodies a member having radiating arms 13 which are provided with cut out portions extending longitudinally thereof, the cut out portions being indicated by the reference character 14, and as shown, the walls of these cut out portions 14 are disposed at oblique angles with respect to the forward surface thereof, so that the cutting blades 15 when positioned therein, will be supported at oblique angles with respect to the face of the cutter. When the blades 15 have been properly positioned, the outer edges of the blades will lie flat on the surface of the perforated cutter plate presenting a cutting edge which will effectively cut the meat forced towards the perforated cutter plate by the feed screw 10.

The rotary cutter is formed with a rectangular opening which is engaged by the rectangular portion of the stud 9 so that the rotary cutter will rotate with the feed screw. As shown, the cutting blades extend from the outer ends of the arms 13, to points flush with the edge of the rectangular opening formed in the rotary cutter, and in which the rectangular portion of the feed screw or worm is disposed the inner ends of the blades being beveled, thereby providing a close fit between the inner ends of the blades 15, and the stud of the feed screw, with which the inner ends of the blades engage eliminating pockets which ordinarily exist, between the inner ends of the blades and stud of the feed screw of conventional meat cutting machines.

Figure 3:
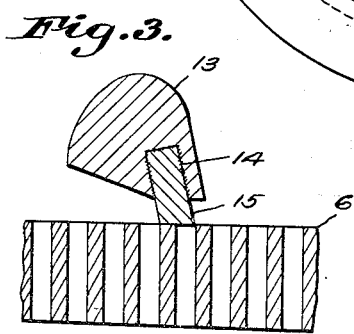
Fig. 3 is an enlarged sectional view taken on line 3—3 of Fig. 2.

As clearly shown by Fig. 3 of the drawing, the surfaces of the arms 13 in which the cutting blades 15 are disposed, are beveled rearwardly from the blades, so that clearances will be provided at the rear of the blades 15, between the surfaces of the radiating arms and surface of the perforated cutter plate, to allow the cut meat to pass freely from the rotary cutter in such a way that the meat will not be caused to back up and impair the cutting operation.

From the foregoing it will be seen that due to the construction shown and described, I have provided a meat cutting machine, wherein the rotary cutter is so constructed that the blades thereof extend to a point flush with the stud of the feed screw of the machine, eliminating cavities in which meat may collect to spoil and impair the quality of the meat.

Having thus described the invention, what is claimed is:

1. In a meat cutting machine having a cylindrical body portion, a perforated cutter plate mounted at one end of the body portion, a feed screw operating within the body portion adapted to force material through the perforations of the cutter plate and a stud on one end of the feed screw extending through a central opening of the perforated cutter plate, the stud having a non-circular portion, the improvement comprising a rotary cutter having a non-circular opening of the same shape as the non-circular portion of the stud and fitted thereover, the rotary cutter embodying radiating arms formed with blade receiving grooves and cutting blades of blade form from end to end secured in the grooves of the radiating arms and having their cutting edges against the perforated cutter plate, each of the cutting blades having the inner extremity of its cutting edge substantially flush with said opening, the non-circular portion of the stud terminating substantially in the plane of the cutting edges of the blades.

2. In a meat cutting machine having a cylindrical body portion, a perforated cutter plate mounted at one end of the body portion, a feed screw operating within the body portion adapted to force material through the perforations of the cutter plate and a stud on one end of the feed screw extending through a central opening of the perforated cutter plate, the stud having a non-circular portion, the improvement comprising a rotary cutter having a non-circular opening of the same shape as the non-circular portion of the stud and fitted thereover, the rotary cutter embodying radiating arms formed with blade receiving grooves and cutting blades of blade form from end to end secured in the grooves of the radiating arms and having their cutting edges against the perforated cutter plate, each of the cutting blades having its inner end face substantially flush with said opening, the non-circular portion of the stud terminating substantially in the plane of the cutting edges of the blades.

3. In a meat cutting machine having a cylindrical body portion, a perforated cutter plate mounted at one end of the body portion, a feed screw operating within the body portion adapted to force material through the perforations of the cutter plate and a stud on one end of the feed screw extending through a central opening of the perforated cutter plate, the stud having a non-circular portion, the improvement comprising a rotary cutter having a non-circular opening of the same shape as the non-circular portion of the stud and fitted thereover, the rotary cutter embodying radiating arms formed with blade receiving grooves and cutting blades of blade form from end to end secured in the grooves of the radiating arms and having their cutting edges against the perforated cutter plate, each of the cutting blades having the inner extremity of its cutting edge substantially flush with said opening, the non-circular portion of the stud terminating substantially in the plane of the cutting edges of the blades, the blades projecting only slightly from the radiating arms so that the arms at the portions thereof receiving the blades closely approach the perforated cutter plate, portions of the arms at the rear of the blades being beveled away from the perforated cutter plate to provide clearance for the passage of material.

References Cited in the file of this patent

UNITED STATES PATENTS

| Number | Name | Date |
|---|---|---|
| 1,097,505 | Asbury | May 19, 1914 |
| 1,239,237 | Wolforsdorf | Sept. 4, 1917 |
| 2,049,083 | Schaefer | July 28, 1936 |
| 2,259,623 | Dieckmann | Oct. 21, 1941 |
| 2,509,976 | Klod | May 30, 1950 |

FOREIGN PATENTS

| Number | Country | Date |
|---|---|---|
| 137,294 | Austria | Apr. 25, 1934 |
| 625,914 | Germany | Feb. 17, 1936 |
| 647,684 | Germany | July 10, 1937 |